US008646328B2

(12) United States Patent
Knowles et al.

(10) Patent No.: US 8,646,328 B2
(45) Date of Patent: Feb. 11, 2014

(54) DISCRETE FLUID LEVEL SENSOR AND MOUNT

(75) Inventors: Terrence J. Knowles, Barrington, IL (US); Brian J. Truesdale, Waukonda, IL (US); Kenneth A. Albrecht, Zion, IL (US); Slawomir P. Kielian, Des Plaines, IL (US)

(73) Assignee: Illinois Tool Works Inc., Glenview, IL (US)

( * ) Notice: Subject to any disclaimer, the term of this patent is extended or adjusted under 35 U.S.C. 154(b) by 892 days.

(21) Appl. No.: 12/519,948

(22) PCT Filed: Jan. 16, 2008

(86) PCT No.: PCT/US2008/051118
§ 371 (c)(1),
(2), (4) Date: Jun. 18, 2009

(87) PCT Pub. No.: WO2008/089209
PCT Pub. Date: Jul. 24, 2008

(65) Prior Publication Data
US 2010/0024543 A1    Feb. 4, 2010

Related U.S. Application Data

(60) Provisional application No. 60/880,822, filed on Jan. 17, 2007.

(51) Int. Cl.
*G01F 23/28* (2006.01)
(52) U.S. Cl.
USPC ........................................................ 73/290 V
(58) Field of Classification Search
USPC ....................................................... 73/290 V
See application file for complete search history.

(56) References Cited

U.S. PATENT DOCUMENTS

| 2,998,723 | A | * | 9/1961 | Smith, Jr. et al. ............ 73/290 V |
| 3,975,582 | A | * | 8/1976 | Ford .......................... 174/153 R |
| 4,890,490 | A |   | 1/1990 | Telford |
| 5,119,676 | A |   | 6/1992 | Bower et al. |
| 5,697,248 | A |   | 12/1997 | Brown |

(Continued)

OTHER PUBLICATIONS

Boyes, Walt (2003). Instrumentation Reference Book (3rd Edition). (pp. 572).*

(Continued)

*Primary Examiner* — Daniel S Larkin
*Assistant Examiner* — Jamar Ray
(74) *Attorney, Agent, or Firm* — Lowe Hauptman & Ham, LLP

(57) ABSTRACT

A level sensor for determining the presence or absence of a liquid in contact with the sensor includes an elongate probe, a transducer operably connected to the probe and configured to produce compressional waves in the probe, and circuitry for detecting acoustic energy emitted into the liquid when liquid is in contact with the probe. A mount for the releasably holding the sensor includes a base have a receiving region formed in part by a plurality of flexible securing fingers. The fingers have locking projections extending therefrom. A contact is mounted to the base and extends into the receiving region. A cartridge supports the level sensor and is received in the receiving region. The cartridge includes a circumferential recess for receiving the securing fingers. When the level sensor is positioned in the cartridge and the cartridge is inserted into the base, the level sensor is operably connected to the contact and the cartridge is resiliently secured in the base.

20 Claims, 7 Drawing Sheets

(56) References Cited

U.S. PATENT DOCUMENTS

| 5,718,816 | A | 2/1998 | Savage et al. |
| 6,640,658 | B1 | 11/2003 | Guerrero et al. |
| 6,993,967 | B2 | 2/2006 | Forgue |
| 2006/0250426 | A1 | 11/2006 | Wanibe et al. |

OTHER PUBLICATIONS

Briggs, G. A. D.; Kolosov, O. V. (2009). Acoustic Microscopy (2nd Edition). (pp. 198). Oxford University Press.*

Written Opinion and International Search Report for PCT/US08/51118 dated Jun. 27, 2008.

* cited by examiner

DISCRETE FLUID LEVEL SENSOR AND MOUNT

CROSS-REFERENCE TO RELATED APPLICATION DATA

The present application is based on International Application Number PCT/US2008/051118 filed Jan. 16, 2008, and claims priority from U.S. application No. 60/880,822 filed Jan. 17, 2007, the disclosures of which are hereby incorporated by reference herein in their entirety.

BACKGROUND OF THE INVENTION

The present invention relates to a fluid level sensor and mount. More particularly, the present invention relates to a fluid level sensor that is insensitive to mineral deposits on the surface of the sensor, and a mount for the sensor.

One popular type of level sensor is a capacitive type of sensor. This sensor is used, for example, in automated machines, such as automated ice making machine. In a typical capacitive type sensor, a metal electrode in the shape of a rod is mounted vertically over a water reservoir. The reservoir is filled and emptied each machine cycle to reduce the build up of dissolved solids which can give the ice a cloudy appearance.

A small high frequency voltage is applied to the metal electrode, and when the water level in the reservoir makes contact with the rod, the capacitance of the rod to ground changes. This change is detected in a signal processing controller, and shuts off the pump filling the reservoir.

This type of sensor has at least one fundamental problem. It has been observed that when the electrode or rod becomes coated with a non-conducting material, such as a calcium carbonate mineral deposit, it acts as a dielectric, adding capacitance in series with the electrode. This additional capacitance is inversely proportional to the coating thickness. As such, as the coating builds up, the additional capacitance dominates the electrode capacitance to ground, at which point sensitivity to liquid level is lost.

In many systems, due to the monitoring and control systems, the loss of sensitivity to liquid level is not a fail safe event. For example in many automated ice making machines, if the water level cannot be detected, water will pump into the reservoir until an overload condition—based on timing—is detected and the pump is shut off. This can render the machine inoperable until service personnel remove the deposits or replace the rod. However, it has been found that cleaning can accelerate the rate of build up on rods.

Accordingly, there is a need for a fluid level sensor that is insensitive to mineral deposits on the surface of the sensor. Desirably, such a sensor is an acoustic-type sensor. More desirably, such a sensor can take various shapes and configurations and can be formed from different materials to suit a desired application. Most desirably, such a sensor is supported within a holder or support that readily accepts the sensor and that precludes the need to directly hard-wire any of the sensor components.

BRIEF SUMMARY OF THE INVENTION

A level sensor for determining the presence or absence of a liquid in contact with the sensor includes an elongate probe, a transducer operably connected to the probe and configured to produce compressional waves in the probe and circuitry for detecting acoustic energy emitted into the liquid, when liquid is in contact with the probe. The probe can be formed as a rod, a strip, a tube or other appropriate shape, and can be formed from metal, polymer, ceramic or other appropriate material.

The probe has a wet end for contact with the liquid and a dry end for electrical contact. The transducer is mounted to the dry end. When formed as a rod, the wet end of the rod can be rounded and a collar can be mounted to the rod at about the dry end. When formed as a strip, the strip has a bend therein defining a wet leg and a dry leg such that the transducer is mounted to the dry leg.

A mount for the level sensor permits mounting the sensor within a system without hard-wiring the sensor to the system. The mount includes a base having a receiving region formed in part by a plurality of depending flexible securing fingers. The fingers have locking projections that project inwardly. One or more contacts are mounted inside of and to the base and extend into the receiving region. Preferably, the contacts are spring mounted to provide positive engagement between the contacts and the transducer.

A cartridge holds the level sensor and is configured for receipt in the receiving region. The cartridge includes a circumferential recess for receiving the securing fingers. The mount is formed from a non-electrically conductive material, such as nylon or the like.

A stop wall is positioned at the about the recess to prevent over-insertion of the cartridge in the base. The cartridge includes a central longitudinal opening for receiving the level sensor and a shoulder at an end thereof the cartridge opposite the recess. A seal is present at about a juncture of the shoulder and the central opening.

When the level sensor is disposed in the cartridge and the cartridge is inserted (snapped) into the base, the level sensor is operably connected to the contact and the cartridge is releasably locked in the base.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings and photographs, wherein.

DETAILED DESCRIPTION OF THE INVENTION

While the present invention is susceptible of embodiment in various forms, there is shown in the figures and will hereinafter be described a presently preferred embodiment with the understanding that the present disclosure is to be considered an exemplification of the invention and is not intended to limit the invention to the specific embodiment illustrated.

Figure 3:
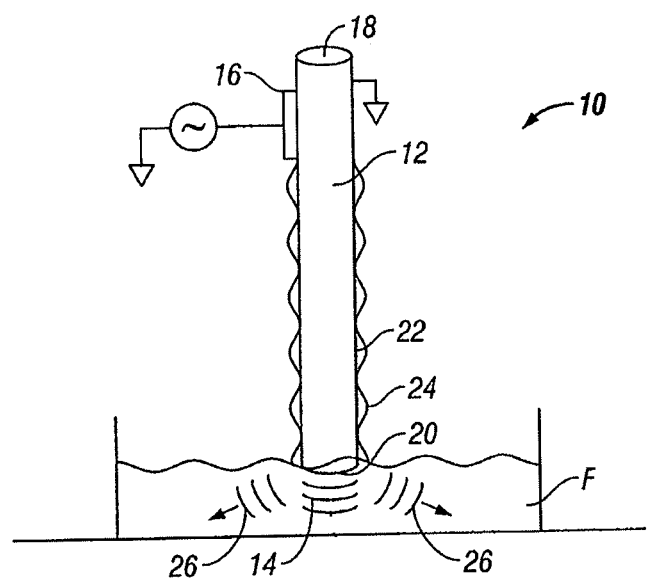
FIG. 3 illustrates one embodiment of a level sensor (probe) in accordance with the present invention.
Figure 5:
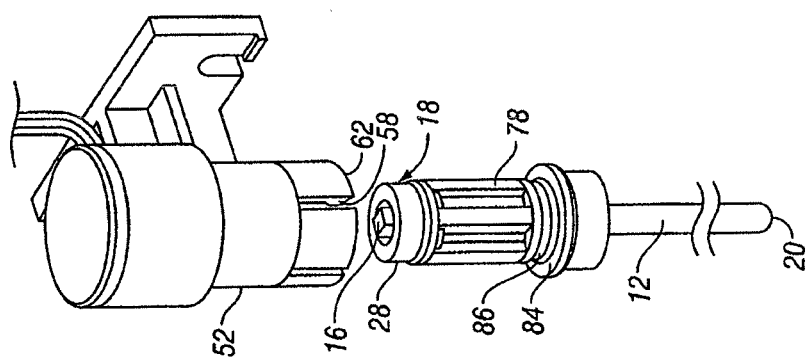
FIG. 5 is a partially exploded view of the mount of FIG. 4.
Figure 4:
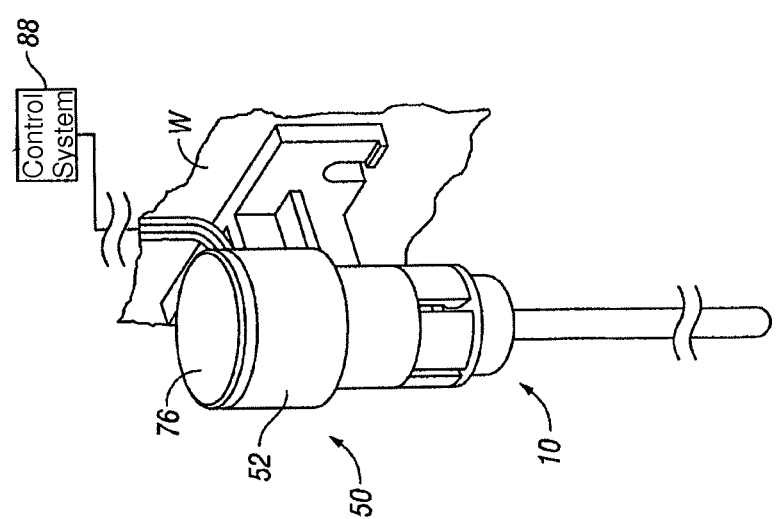
FIG. 4 illustrates a cartridge-type mount for the sensor in accordance with the present invention, showing the sensor cartridge prior to insertion into the mount.

Referring briefly first to FIG. 3 there is shown schematically, a discrete level sensor 10 embodying the principles of the present invention. The sensor 10 includes a probe 12 formed as an elongate element that can be fabricated from a variety of different materials and in a variety of different shapes.

The present sensor 10 is positioned in a system so as to detect the presence or absence of a liquid in contact with the probe 12. In one exemplary application in use in an ice making machine (not shown), the sensor 10 is position to detect the present or absence of water (and thus the level of water) in a water reservoir. In this situation, the sensor 10 is continuously subjected to cycle of wetting and drying. As such, build up of, for example, mineral deposits can occur.

It has been observed that sensors that use thickness shear and torsional modes, can, in principle, be used to sense the presence of water. A preferred embodiment of the present sensor 10 operates on the principle that compressional waves (as indicated at 14), unlike shear waves, propagate in water. The present sensor 10, as seen in FIG. 3, includes a probe that is formed as a rod in which compressional, flexural or rod modes are generated with a shear or compressional transducer 16 attached to an end 18 of the probe 12 opposite of the water sensing or wet end 20.

These modes are trapped in the metal, ceramic or plastic (of the probe 12) until a fluid F touches a surface 22 of the probe 12, at which point the out-of-plane component (as indicated at 24) of the wave motion converts to compressional waves. These waves then radiate into the water (as indicated at 26) where they dissipate.

In effect, the probe 12 acts as an antenna that radiates acoustic energy into the water. In that the energy loss can be substantial, the sensor is quite sensitive to water and other fluids contacting the bottom or sensing surface of the probe 12, but is insensitive to mineral deposits on the sensor surface 22. This is due to the nature of the compressional waves propagating in these deposits even more readily than shear.

Figure 1:
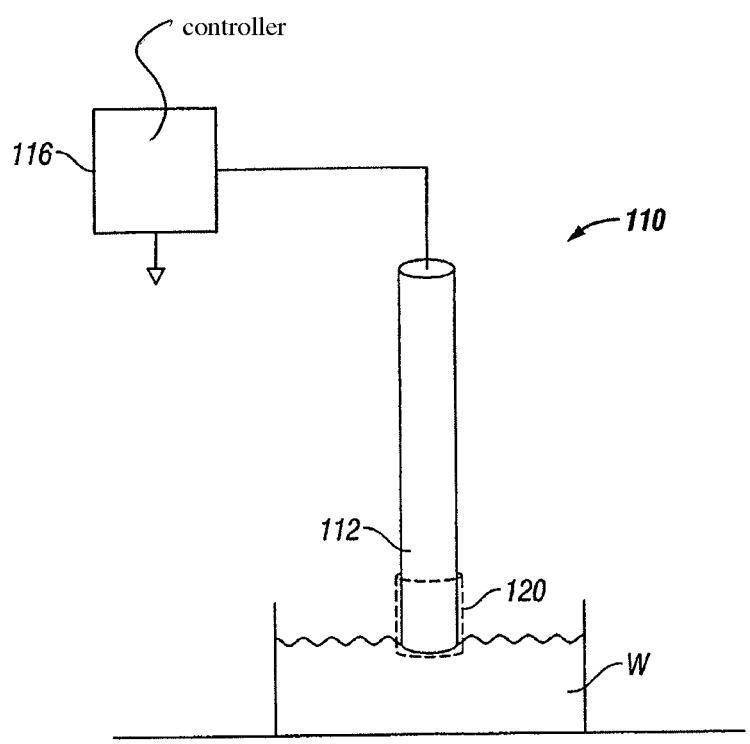
FIG. 1 is schematic illustration of a known capacitance-type level sensor.
Figure 2:
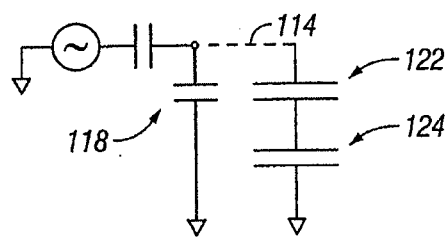
FIG. 2 shows the equivalent circuit of the capacitance probe.

Referring briefly to FIGS. 1 and 2, as set forth above, in prior capacitance-type level sensing systems 110 a small high frequency voltage is applied to the metal electrode 112, and when the water level in the reservoir makes contact with the rod (shown by the lines 114 in phantom), the capacitance of the rod 112 to ground (as indicated at 118) changes. This change is detected in a signal processing controller 116.

This type of sensor 110 has at least one fundamental problem. It has been observed that when the electrode or rod 112 becomes coated with a non-conducting material (as at 120), such as a calcium carbonate mineral deposit, it acts as a dielectric, adding capacitance in series with the electrode (as indicated at 122). This additional capacitance is inversely proportional to the coating thickness. As such, as the coating builds up, the additional capacitance dominates the electrode capacitance to ground 124, at which point sensitivity to liquid level is lost.

Referring again to FIG. 3, unlike known sensors, the present sensor 10 can use either out-of-plane 24 to compressional mode conversion to create an acoustic antenna in the presence of fluids F or it can use a shear mode transducer 16 polarized along the axis $A_{12}$ of the sensor probe 12, to create the out-of plane modes.

For example, when using a shear mode transducer 16, the transducer 16 transmits energy into the probe 12. The change in modes does not occur when water hits the end 20 of the probe 12. Rather, the waves generated by (induced in) the electrode or probe 12 have nowhere to go so they bounce around in the probe. When water reaches the end 20 of the probe 12, the waves have somewhere to go because the mode in the rod converts to compressional waves 26 in the water F. At that point, the acoustic energy starts leaking into the water, which is detected using circuitry commercially available from ITW ActiveTouch of Buffalo Grove, Ill.

In a present sensor system 10, the transducer 16 is a standard shear mode transducer that is resonant at 1 megahertz. The burst frequency is 350 kilohertz which is determined by the dimensions of the rod and it's acoustic characteristics. A 1 MHz transducer is used because of it's ready availability, cost effectiveness and functionality. It is anticipated that compressional mode transducers can also be used. Shear is side to side motion, whereas compressional is more like a pressure wave.

The type of wave that is desirable for the level sensor 10 must be sensitive to fluid (e.g., water) to generate waves that are not sensitive to the fluid. The waves that propagate in, for example, water are compressional type waves. Compressional transducers operate on the principle that waves are formed when two surfaces move toward and away from one another in a repetitive motion.

It has been found that several advantages of the present sensor 10 over known sensing systems include: (1) a liquid level sensor impervious to mineral, grease and detergent build up on the probe; (2) insensitive to e.m.i, no radiation (creation) of e.m.i. and the ability to electrically ground the system; (3) a wide variety of metals, ceramics, PPS plastics and glass can be used for the probe 12, so long as the material selected has the proper acoustic properties; and (4) present resonant decay processing schemes can be used to provide diagnostic information on demand.

Figure 8:
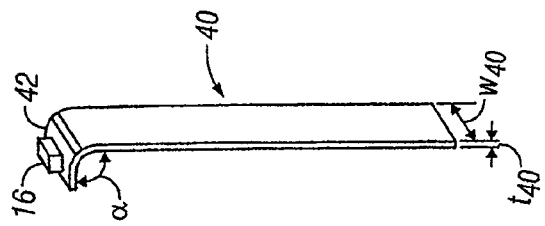
FIG. 8 is a perspective illustration of an alternate embodiment of the sensor in a strip form.
Figure 7:
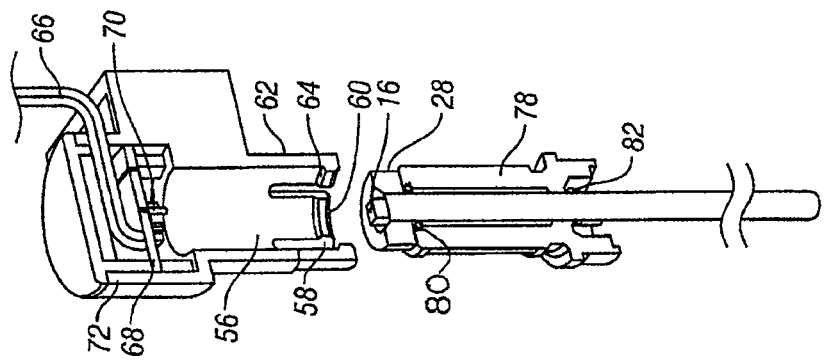
FIG. 7 is a cross-sectional view of the assembled mount and sensor of FIG. 4.

It is anticipated that the probe 12 can be virtually any shape. In addition to the rod shape shown, other know suitable shapes include strips 40 and strips with a leg or bend 42 (as seen in FIG. 8), to, for example, permit mounting the transducer 16. When shaped as a strip with a bend 42, the bend 42 can be at any angle α provided that the radius of curvature is less than the wavelength.

Signal processing schemes can include active metal resonant decay, as well as analog to digital conversion systems and the like. It will be further appreciated that multiple parallel probes can easily be assembled in single or multiple housings to provide for multiple discrete levels by staggering the ends of the probes and that signal processing schemes can be implemented that allow for a continuous level sensor for some applications.

Other configurations and materials of sensors embodying the principles of the present invention were tested to determine the sensitivity of the sensors. In one such example, a sensor was formed as a strip 40 of stainless steel in an L-shape, having a width $w_{40}$ of 0.25 inches and a thickness $t_{40}$ of 50 mils (50 thousandths of an inch). A transducer 16 was mounted to the sensor at the short leg (dry leg) 42 of the sensor 10.

Figure 9A:
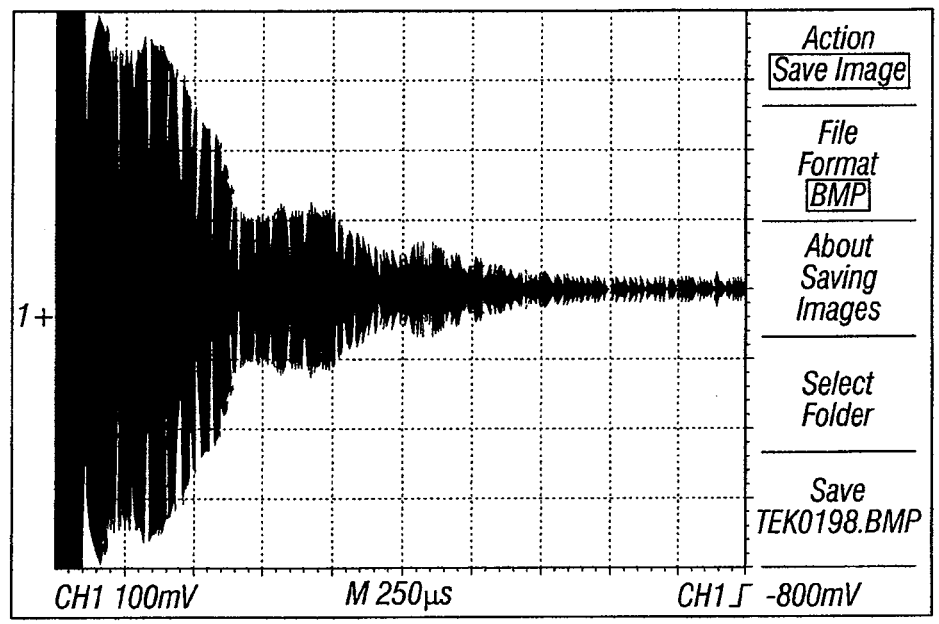
FIGS. 9A-9C are snap shots of spectra of a strip-formed sensor, showing the strip in a dry condition (FIG. 9A); with the strip positioned in oil (FIG. 9B), and with the strip having a drip of oil at the end thereof (FIG. 9C)
Figure 9B:
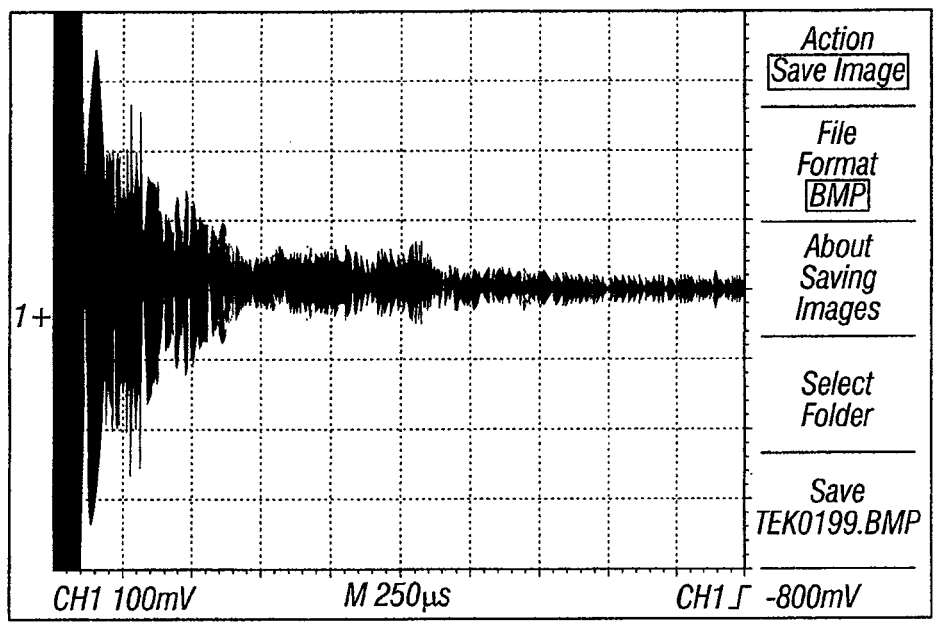
Figure 9C:
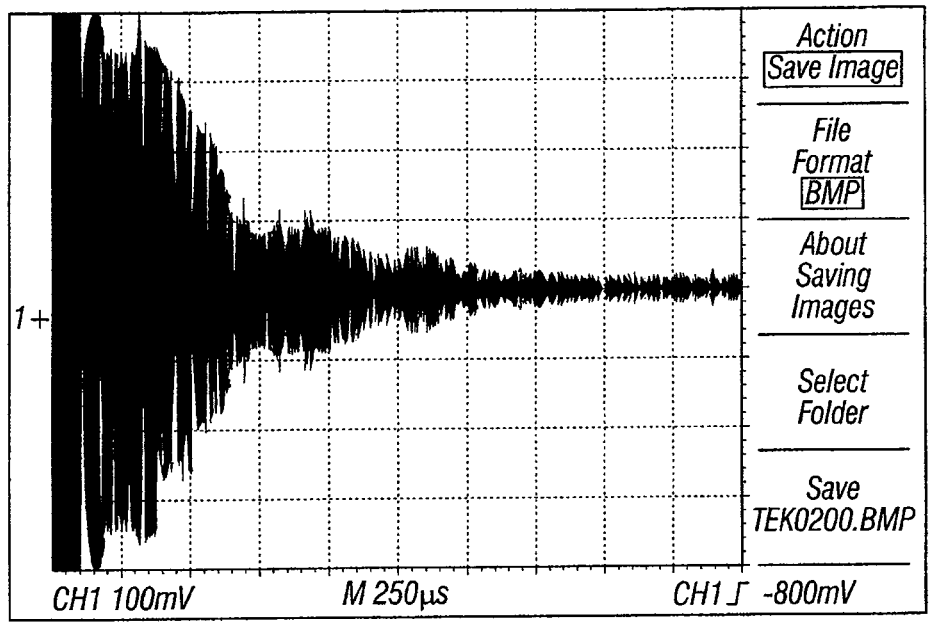

A 360 kHz signal was generated in the transducer 16. Snapshots of three response spectra were taken on an oscilloscope, a first (FIG. 9A) with the strip dry, which is the induced signal or wave, a second (FIG. 9B) with the strip (at the tip) positioned in oil, and a third (FIG. 9C) with a drip of oil coming off of the tip of the strip.

As can be seen from the spectra, there is a clear distinction in the response spectra of the dry strip and the in-oil strip. There is also a significant difference between the dry strip and the oil drip strip and between the in-oil strip and the oil drip strip. Thus, the sensor can detect the presence or absence of liquid and, importantly, the sensor can distinguish between being submerged (within a "pool" of liquid) and merely the presence of remnants of liquid on the sensor.

Figure 10A:
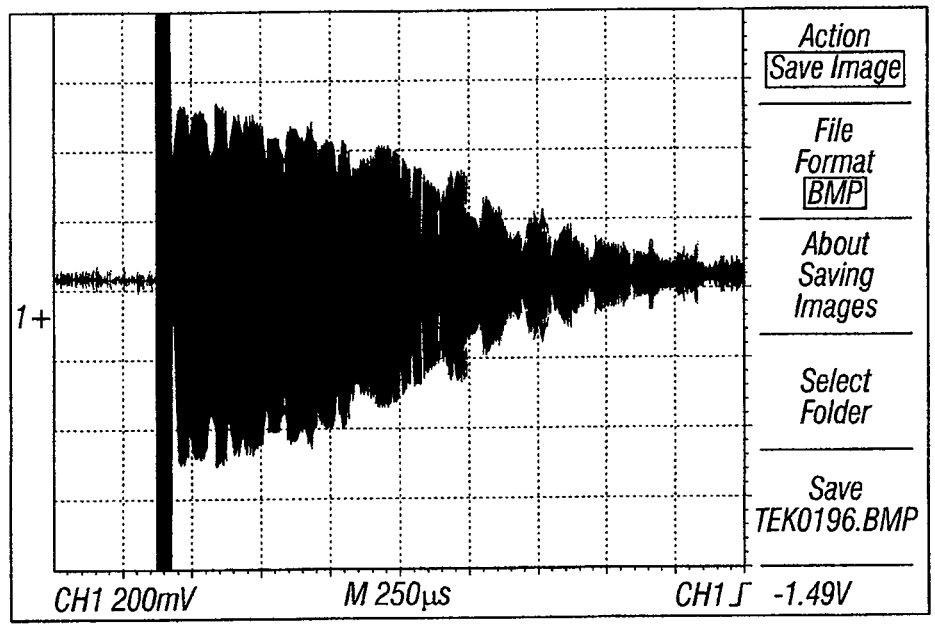
FIGS. 10A-10B are snap shots of spectra of a ceramic rod sensor, showing the rod in a dry condition (FIG. 10A) and with the rod positioned in water (FIG. 10B).
Figure 10B:
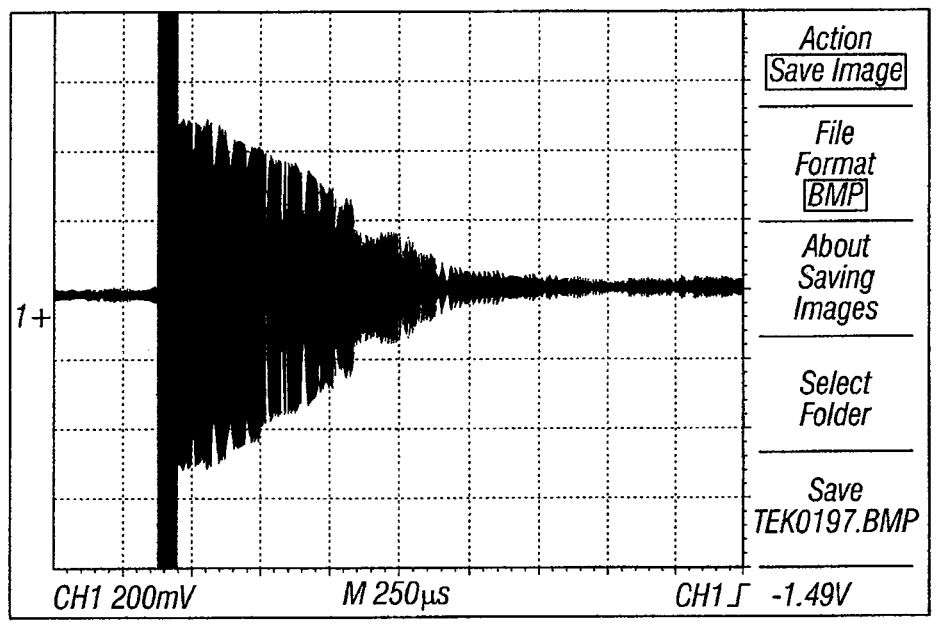

A sensor formed from a ceramic rod was also examined. Here, a 403 kHz signal was generated in the transducer and induced in the rod. Snapshots of two response spectra were taken on an oscilloscope. A first spectra (FIG. 10A) shows the ceramic rod dry and a second spectra (FIG. 10B) shows the ceramic rod in liquid (in this case, water). Again, there is a clear distinction in the response spectra of the dry ceramic rod and the in-liquid rod; thus, the ceramic rod sensor can detect the presence or absence of liquid. Advantageously, such a rod can be used in extremely harsh environments, such as caustic or acidic environments. It is also anticipated that the rod can be elongated to extend into areas that otherwise may be difficult to access.

In a present rod shaped probe 12, it has been found that the tip 20 can be formed having a rounded (e.g., hemispherical) shape to prevent the accumulation of liquid at the tip and to stimulate the formation and release of any droplets from the rod. In a present probe, the radius of the hemisphere is approximately equal to the diameter of the probe 12. It has also been found that rounding the end 20 increases the sensitivity and signal level. Without being bound to theory, it is thought that this reduction in impact and increase in sensitivity is related to acoustic mode conversion.

A novel quick-install, quick-release mount 50 for the sensor 10 is illustrated in FIGS. 4-7. The mount 50 includes a base 52 that is configured to mount to an object, such as a wall W, near the location that is to be monitored. The base 52 has an inverted cup shape that defines a well 56. The cup has channels 58 extending upwardly from the edge 60 to form multiple flexible fingers 62. The fingers 62 can include a retaining lip or detent 64 at about the end of each finger 62 (at about the edge 60).

The base 52 is configured to house the electrical connections 66 for the sensor 10. Accordingly, circuitry is provided on a board 68 or other carrier in the base 52. Contacts 70, preferably biased, e.g., spring-loaded, are positioned at an end 72 of the well 56. Electrical conductors 66 (e.g., wires) are connected to the board 68 and extend out of the base 52 to, for example, a terminal box (not shown) for connection to a control system 88. A cover 76 can be fitted over the board end of the base 52 to permit access to the board 68 or other components.

The probe 12 is carried by a cartridge 78 that fits into the base 52. The probe 12, as illustrated has a collar 28 at an upper end that surrounds the dry end 18 of the rod 12. The transducer 16 is mounted to the dry end 18, about central of the collar 28.

The cartridge 78 is configured as a sleeve that fits over the rod 12, with the rod 12 residing such that the cartridge 78 abuts the collar 28. An isolation seal 80, for example, an O-ring is positioned in the cartridge 78 to abut the rod 12 and collar 28, such that the seal 80 isolates the rod 12 from the cartridge 78 and provides an environmental seal for the components (e.g., board 68 and contacts 70) within the base 52. A retaining clip 82 is positioned at a lower end of the cartridge 78 to maintain the cartridge 78 positioned about the rod 12. In a current mount 50, the materials of construction are non-conducting, polymeric materials, such as nylon and the like. Other suitable materials will be appreciated by those skilled in the art.

Figure 6:
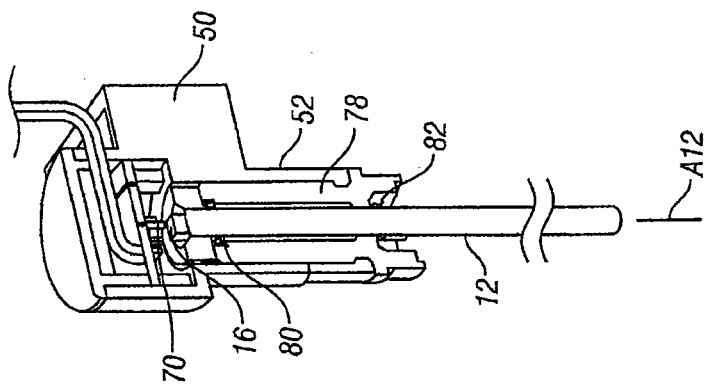
FIG. 6 is a cross-sectional view of the exploded illustration of FIG. 5.

In the present mount 50, the cartridge 78 includes a circumferential shoulder 84 and a recess 86 adjacent to the shoulder 84. The recess 86 is configured to receive the detents 64 (on the fingers 62) when the cartridge 78 is properly inserted in the base 52. When inserted, as seen in FIG. 6, the cartridge 78 snaps into the base 52, the contacts 70 are in contact with the transducer 16 and the probe 12 is securely held in place in the mount 50. Because the cartridge 78 snaps into place in the base 52 and there is no hard-wired connection between the sensor (transducer 16) and the electrical control system 88, this arrangement provides a readily managed and maintained level sensor system 10. Probes 12 can be easily changed by snapping cartridges 78 in and out of the base 52 to, for example, change the level at which the sensor 10 is to generate a signal (e.g., to change the liquid level to be monitored), change the material of the probe 12, or to replace a probe 12, without undue time and labor. In that the mount 50 uses a circumferential shoulder 84, detents 64 and fingers 62, the probe 78 can be inserted and/or reinserted into the mount 50 in any angular orientation and function properly.

The shoulder 84, detents 64 and fingers 62 can be formed having shapes other than those illustrated (e.g., square or hexagonal). In addition, rather than plastic fingers, the detent function can be accomplished by other structures, such as spring, balls fitted into channels, and the like, in which case the mount can be formed of a metal.

It will be appreciated that although certain materials are disclosed and described, various other suitable material could likewise be used, for example, in fabricating the various components of the invention.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover all such modifications as fall within the scope of the claims.

What is claimed is:

1. A level sensor for determining the presence or absence of a liquid in contact with the sensor, comprising:
   an elongate probe;
   a transducer operably connected to the probe and configured to produce compressional waves in the probe;
   circuitry for detecting acoustic energy emitted into the liquid, when liquid is in contact with the probe;
   a cartridge to retain said elongate probe therein; said cartridge having a circumferential recess on an outer surface thereof;
   a seal member disposed at one end of said elongate probe and isolating the elongate probe from said cartridge; and, wherein said cartridge is adapted to be resiliently secured in a base having a plurality of downwardly extending fingers each having an inwardly protruding detent adapted to engage said circumferential recess of said cartridge in a snap fit configuration.

2. The level sensor in accordance with claim 1 wherein the probe is a rod.

3. The level sensor in accordance with claim 2 wherein the rod has a wet end for contact with the liquid and a dry end, and wherein the transducer is mounted to the dry end.

4. The level sensor in accordance with claim 3 including a collar mounted to the rod at about the dry end.

5. The level sensor in accordance with claim 3 wherein the wet end of the rod has a rounded profile.

6. The level sensor in accordance with claim 1 wherein the probe is formed as a strip.

7. The level sensor in accordance with claim 6 wherein the strip has a bend therein defining a wet leg and a dry leg and wherein the transducer is mounted to the dry leg.

8. The level sensor in accordance with claim 1 wherein the probe is formed from a metal.

9. The level sensor in accordance with claim 1 wherein the probe is formed from a polymeric material.

10. The level sensor in accordance with claim 1 wherein the probe is formed from a ceramic material.

11. In combination, a level sensor of claim 1 and a mount for releasably holding the level sensor, the mount comprising: a base have a receiving region formed in part by a plurality of flexible securing fingers, the fingers having locking projections extending therefrom; at least one contact mounted to the base and extending into the receiving region; and a cartridge configured to retain the level sensor therein, the cartridge configured for receipt in the receiving region and including a circumferential recess for receiving the securing fingers, wherein when the level sensor is disposed in the cartridge and the cartridge is disposed in the base, the level sensor is operably connected to the contact and the cartridge is resiliently secured in the base.

12. The combination in accordance with claim 11 wherein the mount is formed from a non-electrically conductive material.

13. The combination in accordance with claim 11 wherein the base has an inverted cup shape defined by a depending skirt portion, and wherein the flexible securing fingers are defined by channels formed in the skirt portion extending longitudinally in the skirt portion from about an edge thereof.

14. The combination in accordance with claim 13 wherein the locking projections are inwardly extending protuberances configured to fit into the cartridge circumferential recess.

15. The combination in accordance with claim 14 wherein the protuberances are circumferentially coextensive with the fingers.

16. The combination in accordance with claim 11 including a stop wall positioned at the about the recess to prevent over-insertion of the cartridge in the base.

17. The combination in accordance with claim 11 including a circuitry containing element positioned in the base and operably connected to the contact.

18. The combination in accordance with claim 17 wherein the at least one contact is mounted to the circuitry containing element.

19. The combination in accordance with claim 17 wherein the cartridge includes a central longitudinal opening for receiving the level sensor, the cartridge including a shoulder at an end thereof the cartridge opposite the recess and including a seal at about a juncture of the shoulder and the central opening.

20. The combination in accordance with claim 11 wherein the at least one contact is spring mounted.

* * * * *